US 6,611,385 B2

(12) United States Patent
Song (10) Patent No.: US 6,611,385 B2
(45) Date of Patent: Aug. 26, 2003

(54) WEARABLE DISPLAY SYSTEM (75) Inventor: Young-ran Song, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/102,014

(22) Filed: Mar. 21, 2002

(65) Prior Publication Data

US 2002/0171939 A1 Nov. 21, 2002

(30) Foreign Application Priority Data

Apr. 30, 2001 (KR) ........................................ 2001-23341

(51) Int. Cl.[7] ........................ G02B 27/14; G02B 27/44; G09B 5/00
(52) U.S. Cl. ...................... 359/630; 359/631; 359/633; 359/637; 359/15; 359/558; 359/566; 345/7; 345/8
(58) Field of Search .................. 359/629, 630, 359/631, 632, 633, 634, 637, 260, 15, 558, 566; 345/6, 7, 8, 9

(56) References Cited

U.S. PATENT DOCUMENTS

| | | | | |
|---|---|---|---|---|
| 4,711,512 A | * | 12/1987 | Upatnieks | 345/7 |
| 5,369,415 A | * | 11/1994 | Richard et al. | 345/7 |
| 5,625,372 A | * | 4/1997 | Hildebrand et al. | 345/8 |
| 5,724,163 A | * | 3/1998 | David | 359/15 |
| 5,991,084 A | * | 11/1999 | Hildebrand et al. | 359/629 |
| 6,191,892 B1 | * | 2/2001 | Isaka et al. | 359/630 |
| 6,351,338 B2 | * | 2/2002 | Nanba | 359/630 |

FOREIGN PATENT DOCUMENTS

JP 2000-56259 2/2000

* cited by examiner

*Primary Examiner*—Loha Ben
(74) *Attorney, Agent, or Firm*—Staas & Halsey LLP (57) ABSTRACT

A wearable display system including a display panel to display a signal processed in a predetermined way. The wearable display system includes a grating to diffract a signal output from the display panel, a waveguide to guide the propagation of a signal diffracted by the grating; and a magnifying lens to magnify the signal propagating through the waveguide and to direct the signal toward an eye of a user. The waveguide is formed by a combination of two or more substrates. According to the wearable display system, optical devices are easily and simply arranged on the waveguide to conform to specifications, and furthermore, are individually manufactured and attached to the waveguide. Therefore, the wearable display system is manufactured with minimum time and effort.

6 Claims, 7 Drawing Sheets

WEARABLE DISPLAY SYSTEM

CROSS-REFERENCE TO RELATED APPLICATION

This application claims the benefit of Korean Application No. 2001-23341, filed Apr. 30, 2001, in the Korean Industrial Property Office, the disclosure of which is incorporated herein by reference.

BACKGROUND OF THE INVENTION

1. Field of the Invention

The present invention relates to a personal display system, and more particularly, to a wearable display system capable of displaying a display signal transmitted through a magnifying optical device, such as an eyeglass-type or goggle-type optical device, at a location near the eye of a user.

2. Description of the Related Art

Conventional optical display systems generally known as head (helmet) mounted display (HMD) systems have been designed for users to see video signals magnified via an eyeglass-type, goggle-type or helmet-type wearable device. These systems may be used in the military, medicine, or for personal entertainment. This personal display system allows users to receive video information while moving from place to place.

Figure 1:
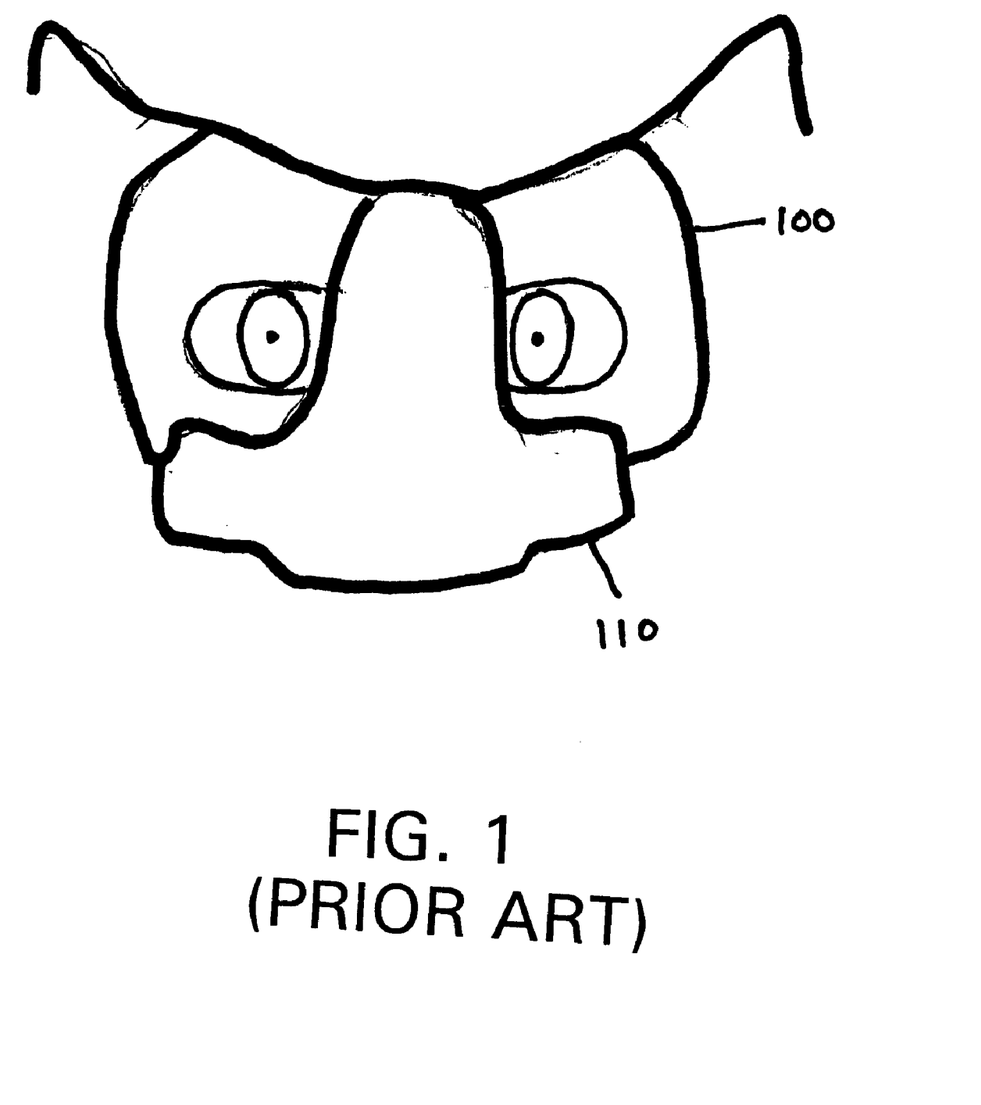
FIG. 1 is a schematic view of a conventional head mounted display (HMD)

FIG. 1 shows an example of the appearance of a conventional HMD. Referring to FIG. 1, the HMD is made of eyeglasses 100 and an image-driving unit 110 that is attached at the center of the eyeglasses 100. Because of the image-driving unit 110, the HMD is bulky, heavy and not elegant. The image-driving unit 110 is large and heavy because many optical elements are included in the unit.

Figure 2:
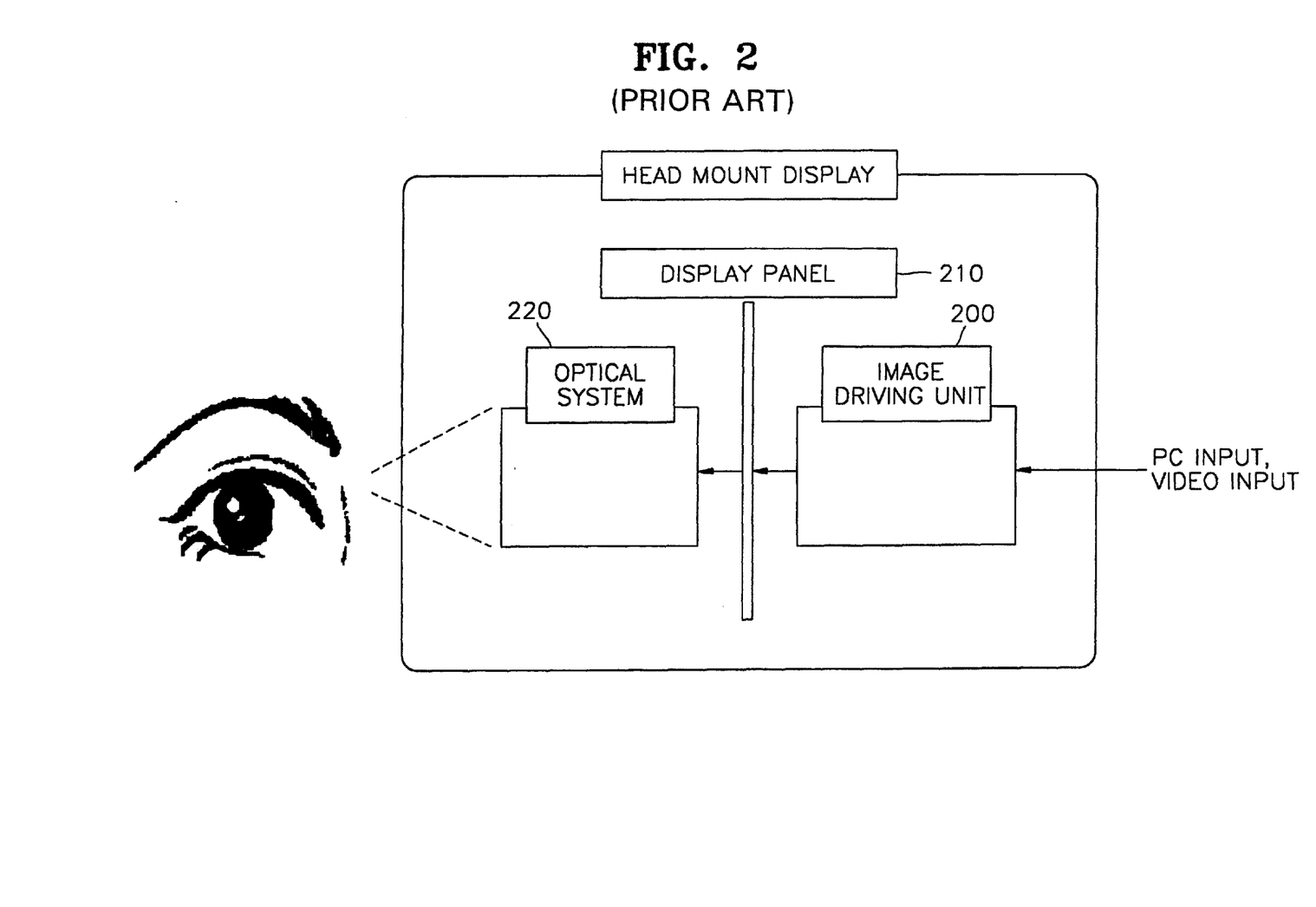
FIG. 2 is a block diagram of the conventional HMD of FIG. 1.

FIG. 2 shows the structure of a conventional HMD. In FIG. 2, the HMD includes an image-driving unit 200, a display panel 210 and an optical system 220. The image-driving unit 200 stores an image signal received from external sources such as a personal computer or video device (not shown), processes the received signal and displays the signal on the display panel 210, such as a liquid crystal display (LCD) panel. The optical system 220 makes the image signal displayed on the display panel 210 appear as a virtual image in the eye of a user via an enlargement optical system. The HMD may further include devices used to wear the HMD or a cable for receiving the image signals from the external source.

Figure 3:
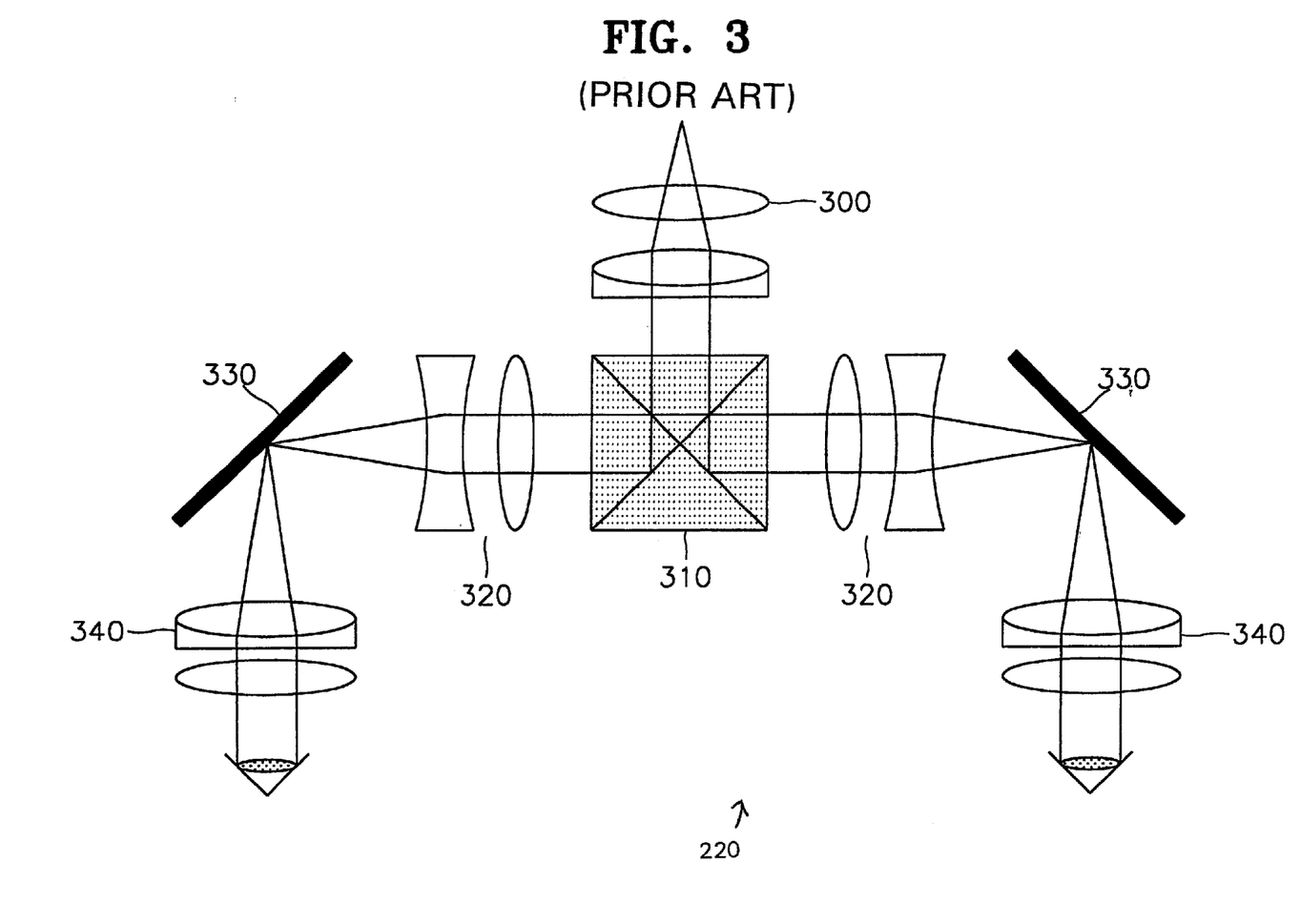
FIG. 3 is a schematic diagram of the optical system of the conventional HMD of FIG. 2.

FIG. 3 shows the general structure of the optical system 220 of the conventional HMD of FIG. 2. A conventional optical system includes a collimating lens 300, an X prism 310, focusing lenses 320, fold mirrors 330 and ocular lenses (or magnifying lenses) 340. The collimating lens 300 collimates and propagates light (an image signal) emitted from the display panel or the like. The X prism 310 redirects the light received from the collimating lens 300 in both the right and left directions. The focusing lenses 320 are separately placed on the right and left sides of the X prism 310 so that collimated light passing through the X prism 310 is focused. The fold mirrors 330 change the direction of incident light so that the light focused by the focusing lenses 320 travels toward the eyes of a user. The ocular lenses (or magnifying lenses) 340 allow small image signals passing through the above-described optical elements to appear in the eyes of the user. At this time, if an image signal transmitted through the ocular lenses 340 has color, lenses for removing a chromatic aberration must be used as the ocular lenses 340.

In the conventional HMD, the optical system 220 employs several optical elements to meet precise design specifications. For this reason, it is difficult to manufacture the general wearable display system because much effort, expense and time are required. Even if the lenses and elements are designed precisely, difficulty in aligning the lenses and devices may occur. Furthermore, the conventional optical system is bulky and heavy due to the use of a plurality of optical devices, thus, it is inconvenient for a person to wear the HMD.

SUMMARY OF THE INVENTION

Accordingly, it is an object of the present invention to provide a wearable display system that is simple to manufacture using a minimum number of optical devices.

Additional objects and advantages of the invention will be set forth in part in the description which follows and, in part, will be obvious from the description, or may be learned by practice of the invention.

The foregoing and other objects of the present invention are achieved by providing a wearable display system including a display panel to output a signal processed in a predetermined way; a grating to diffract the signal output from the display panel; a waveguide to guide a propagation of the signal diffracted by the grating, the waveguide including first and second substrates; and a magnifying lens to magnify the signal propagating through the waveguide.

The foregoing and other objects of the present invention are also achieved by providing a method of manufacturing a wearable display system that includes a display panel to display a signal processed in a predetermined way, the method including forming a first optical device on a first substrate, the first optical device to transmit the signal displayed by the display panel into the first substrate at a predetermined total internal reflection angle; forming a second optical device on a second substrate, the signal being transmitted into the second substrate at the total internal reflection angle, the second optical device to receive the signal from the second substrate and output the received signal; and combining the first and second substrates.

The foregoing and other objects of the present invention are also achieved by providing a wearable display system including at least one display panel to display a signal processed in a predetermined way; at least one grating to diffract the signal displayed by the display panel; a waveguide to guide a propagation of the signal diffracted by the grating, the waveguide including first and second substrates; and at least one magnifying lens to magnify the signal propagating through the waveguide.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 4A:
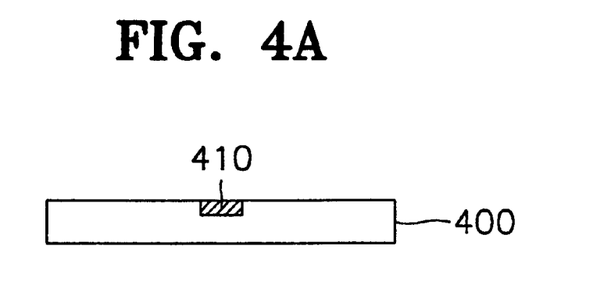
FIGS. 4A and 4B are views of the exterior of a wearable display system according to an embodiment of the present invention.
Figure 4B:
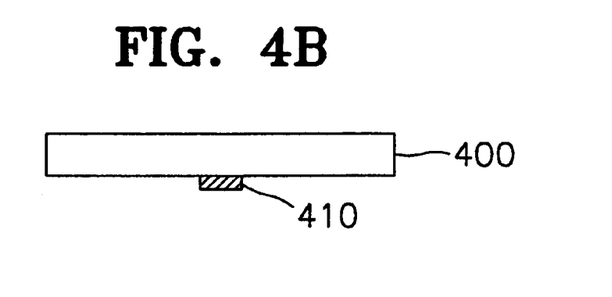

FIGS. 4A and 4B are a front view and an upper side view of a wearable display system according to an embodiment of the present invention, respectively. In FIGS. 4A and 4B, the wearable display system has a simple structure in which a lens 400 and a display panel 410 are combined with each other. The wearable display system according to the present invention is thinner, lighter and smaller than the conventional design due to the use of a grating and a magnifying lens. Thus, the wearable display system according to this embodiment of the present invention is convenient to wear, like eyeglasses, unlike existing bulky and heavy helmet-type HMDs. Furthermore, the present invention provides a module-type wearable display system in which a module is capable of being attached to and detached from conventional eyeglasses. The exterior of a wearable display system illustrated in FIGS. 4A and 4B is just an example, and a variety of thin, light and small wearable display systems having different exteriors can, be realized.

A wearable display system according to the present invention can be manufactured both as a binocular type and a monocular type. A binocular type is designed for a user to look at a display image using both of his or her eyes, whereas a monocular type allows a user to look at a display image using only one of his or her eyes.

A monocular-type wearable display system, according to the present invention, will be described below.

Figure 5:
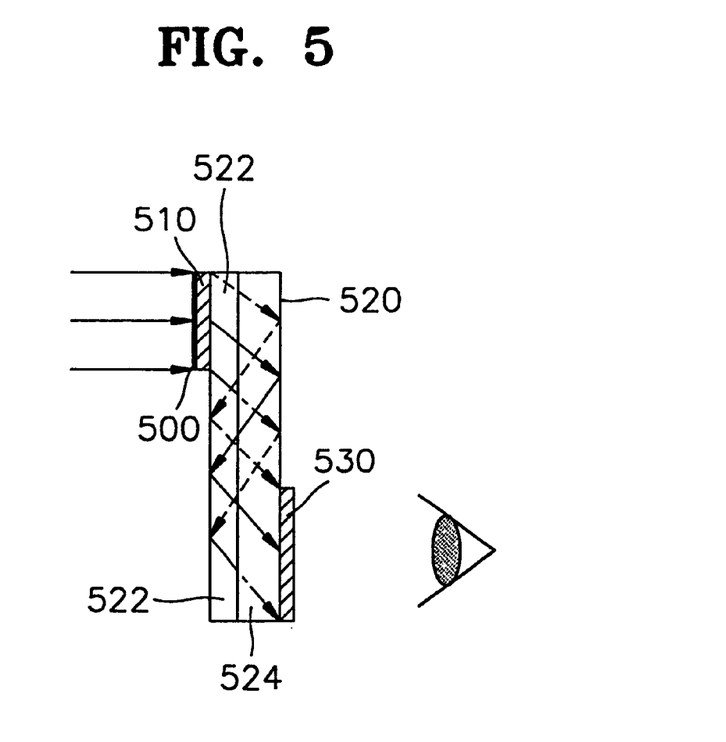
FIG. 5 is a view of a wearable display system according to the present invention.

FIG. 5 is a view of a wearable display system according to this embodiment of the present invention. The wearable display system includes a display panel 500, which displays a signal processed in a predetermined way, a grating 510, a waveguide 520 and a magnifying lens 530. The grating 510 diffracts a signal output from the display panel 500 at a predetermined angle into the waveguide 520. The waveguide 520 is made of two substrates, i.e., first and second substrates 522 and 524. When the substrates 522, 524 are combined with each other to form the waveguide 520, matching oil is used to remove an air layer interposed therebetween. The magnifying lens 530 magnifies a signal transmitted from the waveguide to the eye of the user. The focal distance of the magnifying lens 530 must be longer than the path of the light through the waveguide 520 from the grating 510 to the magnifying lens 530.

In FIG. 5, the grating 510 and the magnifying lens 530 appear to be attached to different substrates. In fact, the grating 510 and the magnifying lens 530 are attached to the first substrate 522 and the second substrate 524, respectively, and then, the substrates 522, 524 are combined with each other, thereby alleviating difficulty in sequentially making a grating and a magnifying lens on one waveguide. When optical devices such as a grating and a magnifying lens are sequentially attached to a substrate which becomes a waveguide, if just one optical device is not satisfactorily attached to the waveguide, the whole display system cannot be used. However, when predetermined optical devices are individually attached to different substrates and then the substrates are combined with each other to form a waveguide, the other substrate can be used even if the optical device attached to one substrate is improperly manufactured or attached. As a result, it is possible to save time, cost and effort.

The optical principles enabling the structure of the wearable display system shown in FIG. 5 will be described below. To make the wearable display system shown in FIG. 5, the sizes of the grating 510 and the magnifying lens 530, the number of times a signal is totally reflected in the waveguide 520 and the length and width of the waveguide 520 must be considered.

Figure 6:
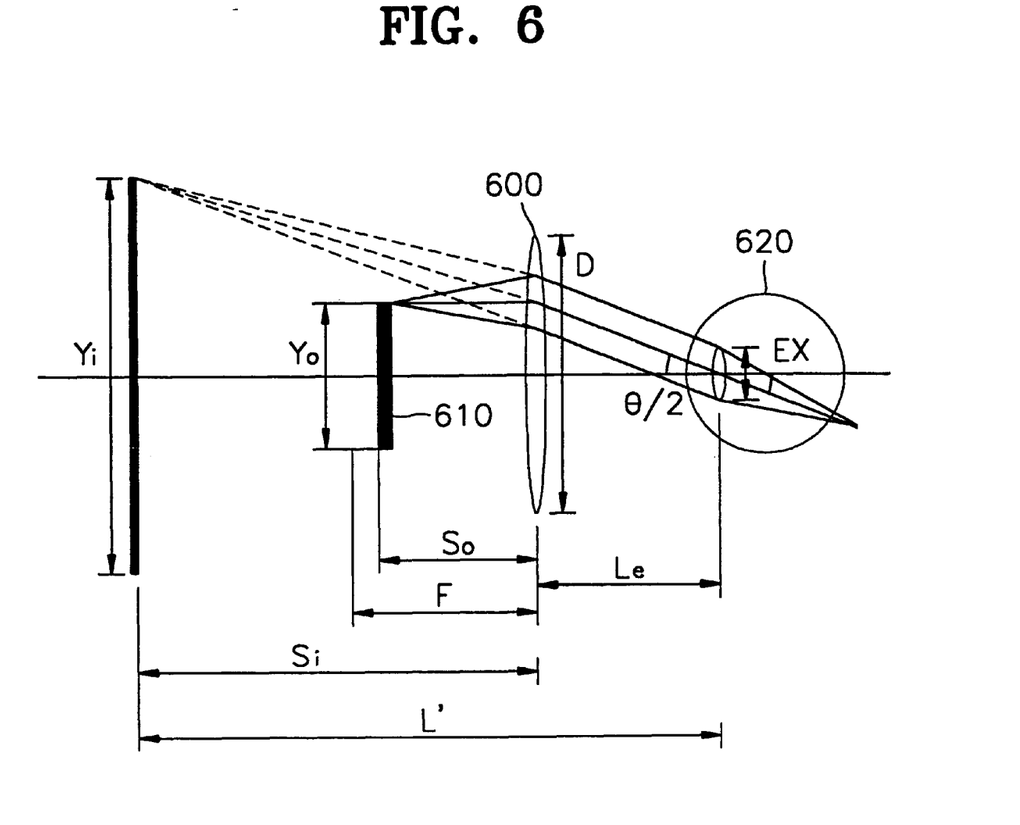
FIG. 6 is a diagram for explaining parameters of a magnifying optical system which are needed in determining the size of a display panel, the size and position of a screen, an eye relief, a field of view (FOV) and the focus and size of a lens, according to the present invention.

FIG. 6 is a diagram for explaining parameters of a magnifying optical field which are needed in determining the size of a display panel, the size and location of a screen, an eye relief, a field of view (FOV), a focus and a size of a lens, and so on. Referring to FIG. 6, F denotes the focal length of a lens 600 corresponding to the magnifying lens 530 shown in FIG. 5, and D denotes the diameter of the lens 600. Yo denotes the size of an object 610 that corresponds to the display panel 500 shown in FIG. 5. So denotes a distance between the object 610 and the lens 600, which corresponds to the distance between the display panel 500 and the magnifying lens 530. Here, So must be shorter than the focal distance F of the lens 600 so that an image of the object 610 is magnified to the eye of the user. According to optical principles, the path of a signal which is incident upon and propagates in the waveguide 520 is designed to be shorter than the focal distance F of the magnifying lens 530 in FIG. 5. Yi denotes the size of a virtual image of the object 610 seen at a position of a user's eye 620 and EX is the size of the exit pupil of the user's eye 620. Le denotes a distance between the eye of the user 620 and the lens 600, i.e., eye relief. L' denotes a distance between the user's eye 620 and the virtual image Yi, and θ/2 denotes half of a field of view (FOV) defined below. Si denotes a distance between the virtual image and the lens 600.

To obtain parameters of a magnifying lens using the above-described optical parameters, the type of lens 600 and the position of an object 610 must first be determined. That is, the size Yo of the object 610, the size Yi of the virtual image, the distance L' between the virtual image and the eye of the user, the eye relief Le and the exit pupil Ex of the eye of the user must first be determined. Using these optical parameters, a magnification M is obtained by the following expression (1):

$$M = \frac{Yi}{Yo} = \frac{Si}{So} \qquad (1)$$

The distance So can be measured by applying the obtained M value to the following expression (2):

$$So = \frac{Si}{M} \qquad (2)$$

Next, the focal distance F of the lens 600 is calculated using So and Si as follows:

$$\frac{1}{So} - \frac{1}{Si} = \frac{1}{f} \quad (3)$$

Then, the field of view (FOV) is calculated as follows:

$$FOV_\theta = 2\tan^{-1}\frac{Yi}{2L'} \quad (4)$$

The diameter D of the lens 600 is measured as follows:

$$\tan\frac{\theta}{2} = \frac{D}{2Le} \quad (5)$$

Expression (5) is related to only a light signal that is incident upon the center of the exit pupil, and therefore, the real diameter D of the lens 600 must be measured considering the size of the exit pupil EX as follows:

$$D = 2Le\tan\frac{\theta}{2} + Ex \quad (6)$$

According to the present invention, once the sizes of the object and image, which is a screen, and the distance therebetween are determined, it is possible to calculate the focus and size of the lens and the length and thickness of the waveguide 520 using equation (6).

Figure 7:
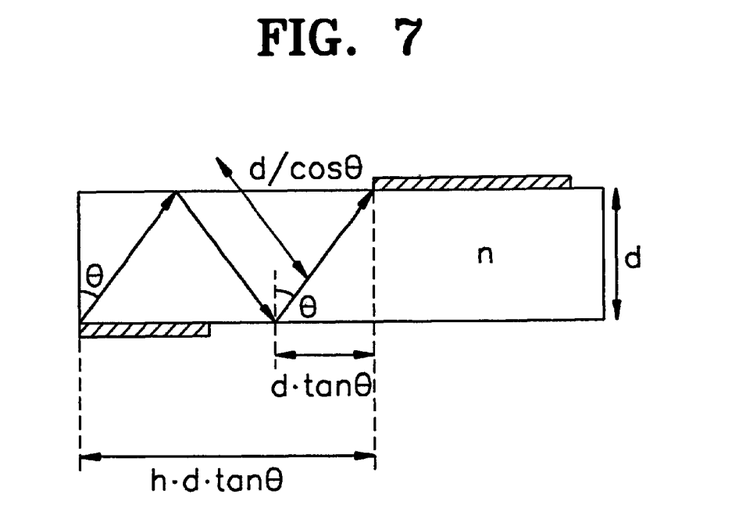
FIG. 7 is a view for explaining a propagation distance of light in a waveguide, according to the present invention.

FIG. 7 is a view for explaining a propagation distance of light in a waveguide. Referring to FIG. 7, a signal (light) proceeding in the waveguide is totally reflected at an angle θ given by:

$$\theta > \theta_c = son^{-1}\frac{1}{nSo} \quad (7)$$

wherein θc is the critical angle of total internal reflection, n is the refractive index of the waveguide, d is the thickness of the waveguide and So is the distance which the signal propagates between an object and a lens. According to the above optical principles, the distance from the center of a grating to the center of a magnifying lens must be shorter than the distance So. Here, the size of the grating is almost equal to that of a display panel. When light is reflected in the waveguide h times, the following relation is obtained:

$$h\frac{d}{\cos\theta} = \frac{So}{n} \quad (8)$$

In FIG. 7, the propagation distance of a signal in a waveguide is given by h×d×tanθ. As described above, it is possible to place a magnifying lens so that a signal propagating through a waveguide is reflected at a predetermined number of times and thereafter reaches the magnifying lens.

Two separate substrates to which a grating and a magnifying lens are attached (or engraved in) are combined with each other considering the above design parameters. At this time, matching oil is applied between these substrates so that they are combined to function as a waveguide. According to the present invention, substrates including several optical devices thereon are arranged to satisfy the above optical principles, thereby enabling an improved display system to be manufactured to desired specifications.

Figure 8A:
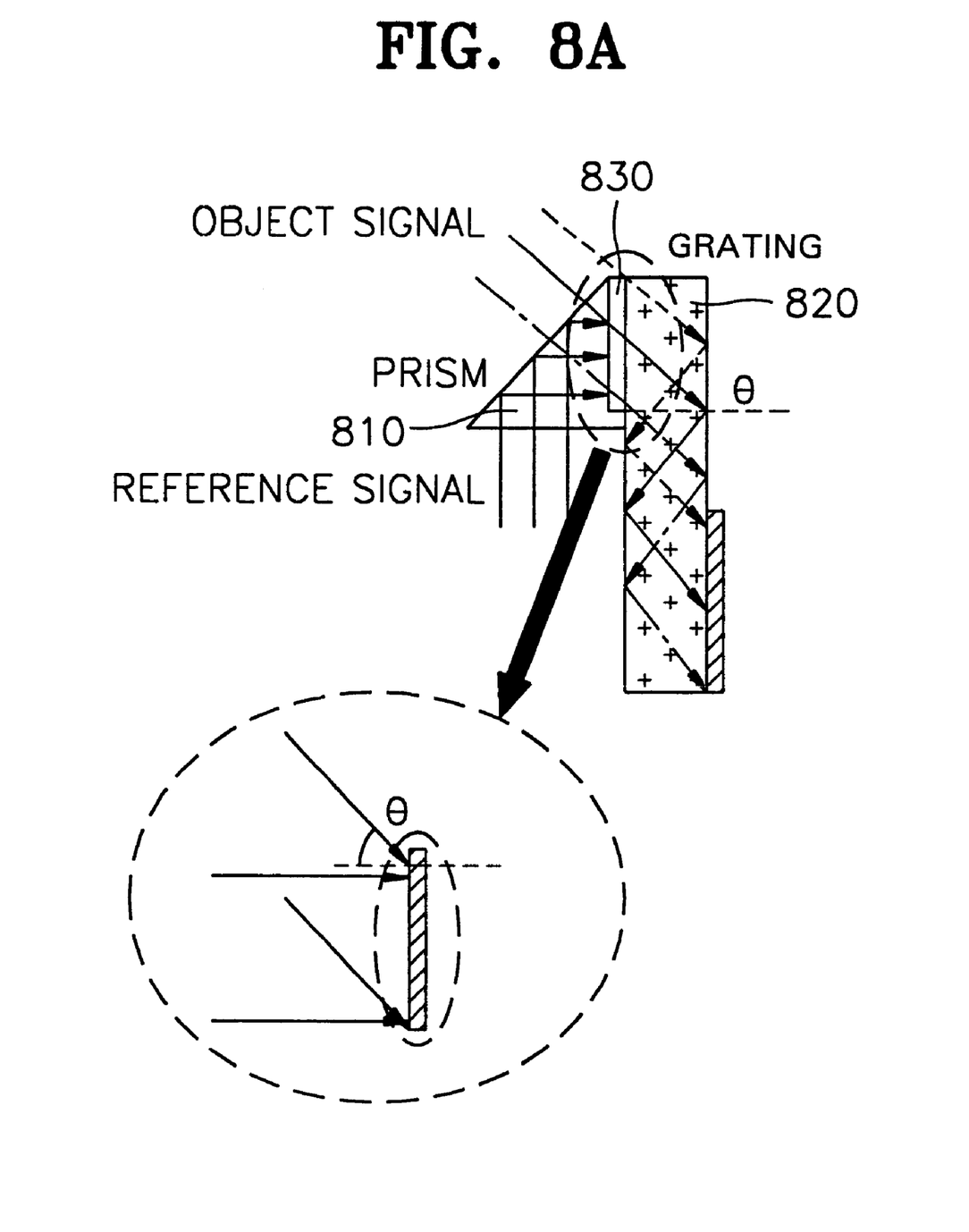
FIGS. 8A an 8B are views for explaining methods of fabricating a grating on a first waveguide and fabricating a magnifying lens on a second waveguide in a wearable display system according to the present invention.
Figure 8B:
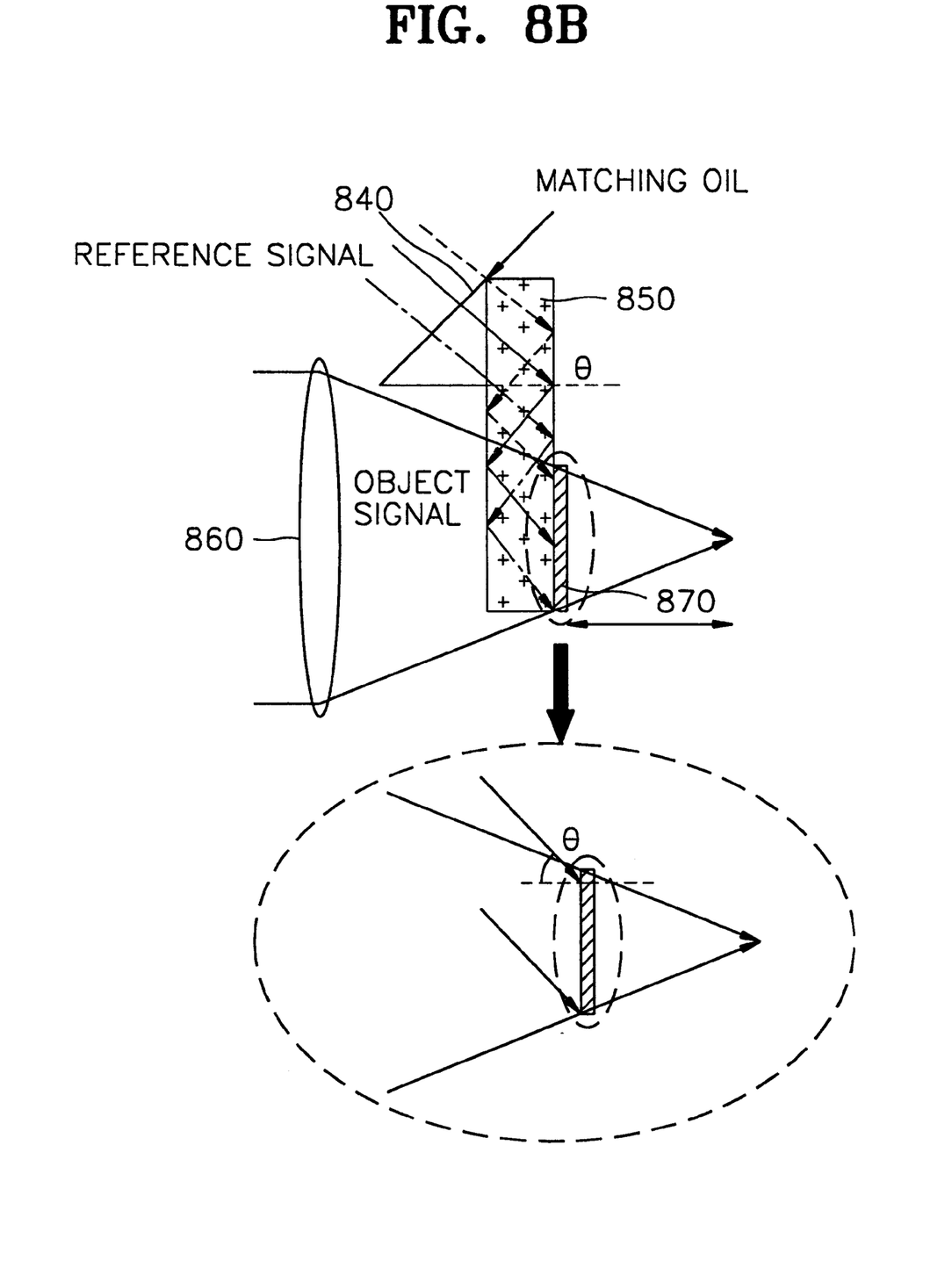

FIGS. 8A and 8B are views for explaining methods of manufacturing the grating 510 on the first substrate 522 and manufacturing the magnifying lens 530 on the second substrate 524, respectively.

FIG. 8A is a view for explaining a method of manufacturing a grating. If the grating is a hologram type, a signal must be incident on a substrate 820 via a prism 810 at a predetermined total internal reflection angle. At this time, matching oil is applied between the prism 810 and the substrate 820 so that a signal is not refracted therebetween. Then, to make the signal incident upon the substrate 820 under a predetermined incidence condition, the substrate 820 and the prism 810 are arranged, then the prism 820 is taken away from the arranged position. Next, photosensitive film such as a photopolymer is provided in place of the prism 820, and the prism 820 is again put on the original place on which the photosensitive film is placed, and light is repeatedly shone upon the prism 820. As a result, a diffraction pattern is formed on the attached photosensitive film, which becomes a grating 830. In FIG. 8A, when a signal is incident at the same angle as a pre-recorded reference signal, the incident signal is transmitted into the waveguide at the same angle at which the object signal was incident.

FIG. 8B is a view for explaining a method of manufacturing a magnifying lens on a substrate so that a signal, which propagates through the waveguide by reflection at a predetermined angle, is output to the outside of the waveguide and focused at a predetermined distance from the waveguide. In the method, a prism 840 is positioned diagonally opposite to a magnifying lens on the outer surface of a waveguide 850, and light (or a signal) is transmitted into the waveguide at the same angle as the object wave shown in FIG. 8A through the prism 840. The signal transmitted into the waveguide 850 is reflected in the waveguide 850 at the same angle as the object signal in FIG. 8A. At this time, the reflected signal functions as a reference signal. Then, a lens 860 is placed on an outside of the waveguide, and light is transmitted through the lens 860, and passed through the waveguide 850 to be focused on the eye of the user, positioned at a predetermined distance. The light transmitted through the lens 860 functions as an object signal. A magnifying lens 870 is placed on the waveguide 850 through which the object signal passes. In the event that the magnifying lens 870 is made with a hologram lens, a predetermined hologram thin film is irradiated with an object signal passing through the lens 860, and a reference signal passing through the prism 840. Then, when a signal is incident on the hologram thin film at the same angle as the reference signal, a diffraction pattern is formed on the hologram thin film. The hologram thin film, that is a hologram lens, can further magnify an image of an object.

Once the magnifying lens 870 and the substrate 820 are manufactured by the method of FIGS. 8A and 8B, it is possible to manufacture magnifying lenses and gratings, which have the same performance as the magnifying lens 870 and the substrate 820, respectively, on a large scale. Also, according to the present invention, substrates including optical devices are combined with each other to form a waveguide using predetermined design parameters or experimental results. Therefore, it is possible to more easily and simply attach optical devices to a waveguide than to sequentially manufacture optical devices on a waveguide.

The above method can be also applied to a binocular-type wearable display system in which the user looks at the display image using both of his or her eyes.

As described above, a wearable display system according to the present invention has a simple structure because optical devices are attached to separated substrates and the substrates are combined with each other to form a waveguide. Also, it is possible to arrange a grating and a magnifying lens on a waveguide according to predetermined optical parameters such that if one of the grating and the magnifying lens is damaged or misaligned, half of the waveguide including the damaged part can be removed and replaced.

Furthermore, optical devices are easily and simply arranged on a waveguide to conform to specifications, and are individually manufactured and attached to a waveguide. Therefore, a wearable display system can be manufactured with minimum time and effort.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A wearable display system comprising:
   a display panel to output a signal processed in a predetermined way;
   a grating to diffract the signal output from the display panel;
   a waveguide to guide a propagation of the signal diffracted by the grating, the waveguide comprising first and second substrates; and
   a magnifying lens to magnify the signal propagating through the waveguide.

2. The wearable display system according to claim 1, wherein the signal which is diffracted by the grating into the waveguide is reflected in the waveguide at least two times before reaching the magnifying lens.

3. A method of manufacturing a wearable display system that includes a display panel to display a signal processed in a predetermined way, the method comprising:
   forming a first optical device on a first substrate, the first substrate to transmit the signal displayed by the display panel into the first substrate at a predetermined total internal reflection angle;
   forming a second optical device on a second substrate, the signal being transmitted into the second substrate from the first substrate at the total internal reflection angle, the second optical device to receive the signal from the second substrate and output the received signal; and
   combining the first and second substrates.

4. The wearable display system according to claim 3, wherein the first and second optical devices comprise a grating and a magnifying lens, respectively.

5. The wearable display system according to claim 3, wherein the first optical device comprises the display panel.

6. A binocular wearable display system comprising:
   at least one display panel to display a signal processed in a predetermined way;
   at least one grating to diffract the signal displayed by the display panel;
   a waveguide to guide a propagation of the signal diffracted by the at least one grating, the waveguide comprising first and second substrates; and
   at least one magnifying lens to magnify the signal propagating through the waveguide.

* * * * *